May 13, 1969          H. R. LYELL          3,443,581
MEANS FOR SECURING STANDPIPES TO IRRIGATION PIPELINES
Filed Oct. 24, 1966          Sheet 1 of 4
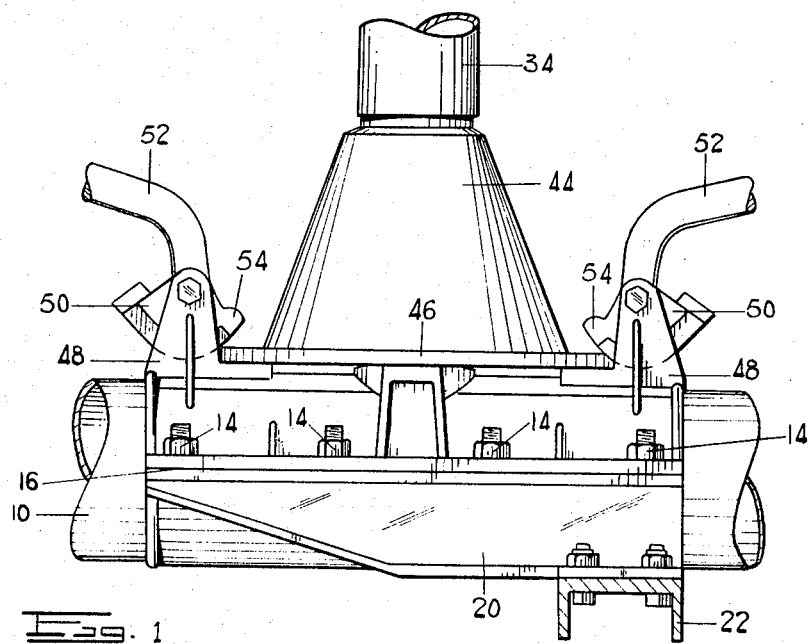
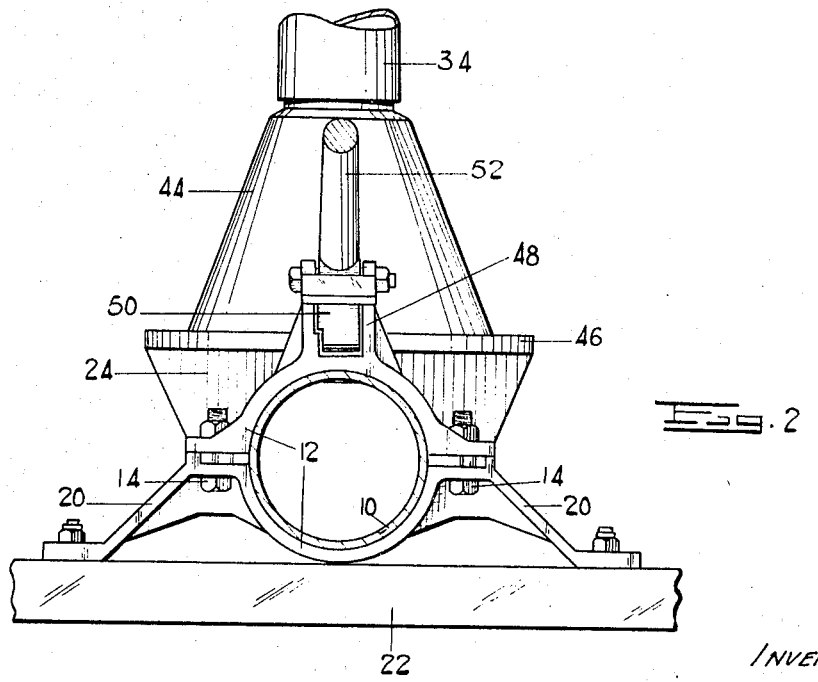
INVENTOR
HUGH R. LYELL
BY Young + Thompson
ATTYS.

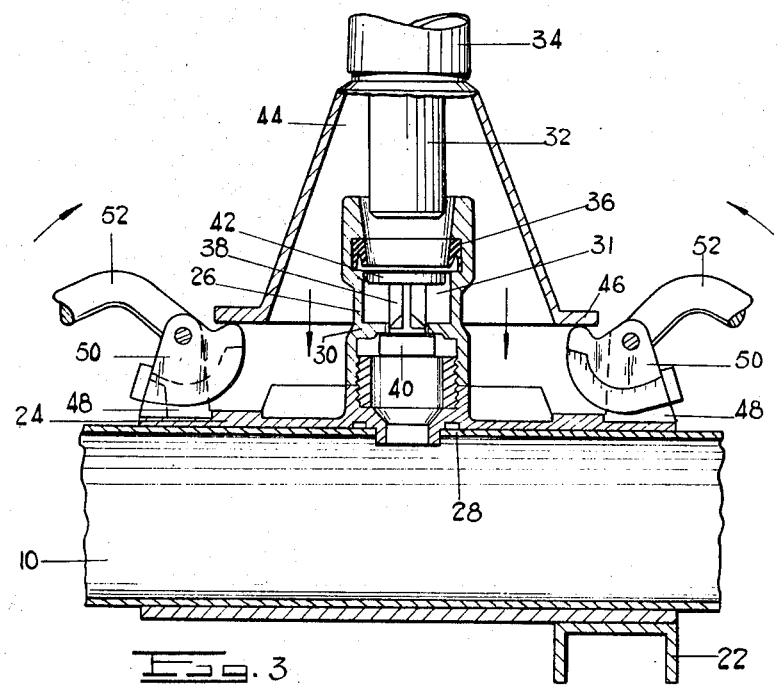
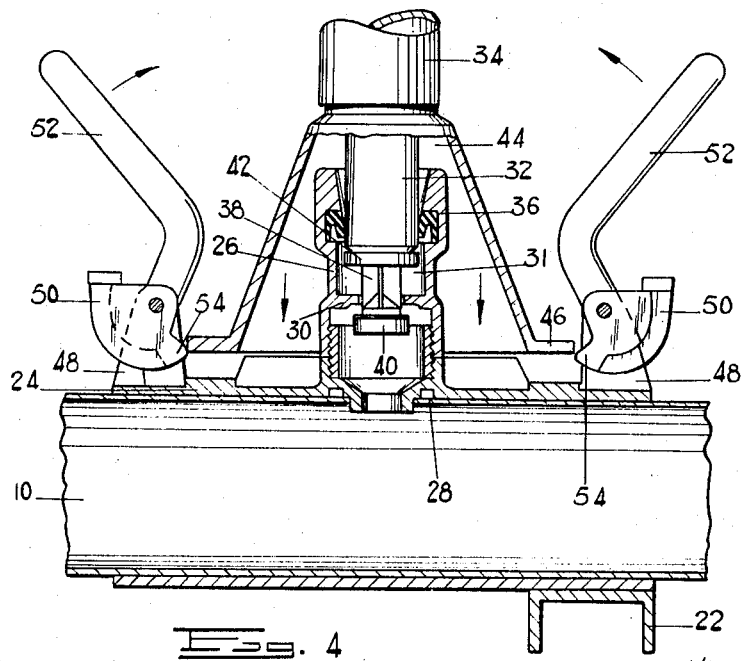

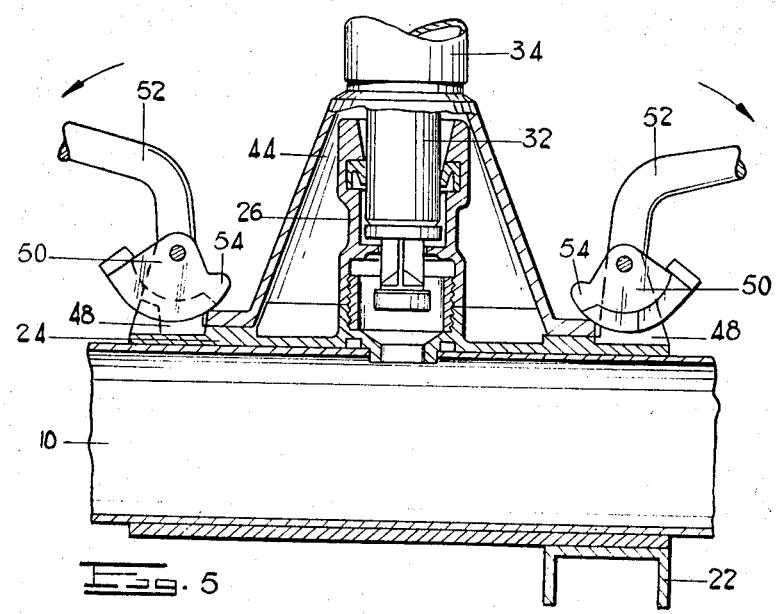
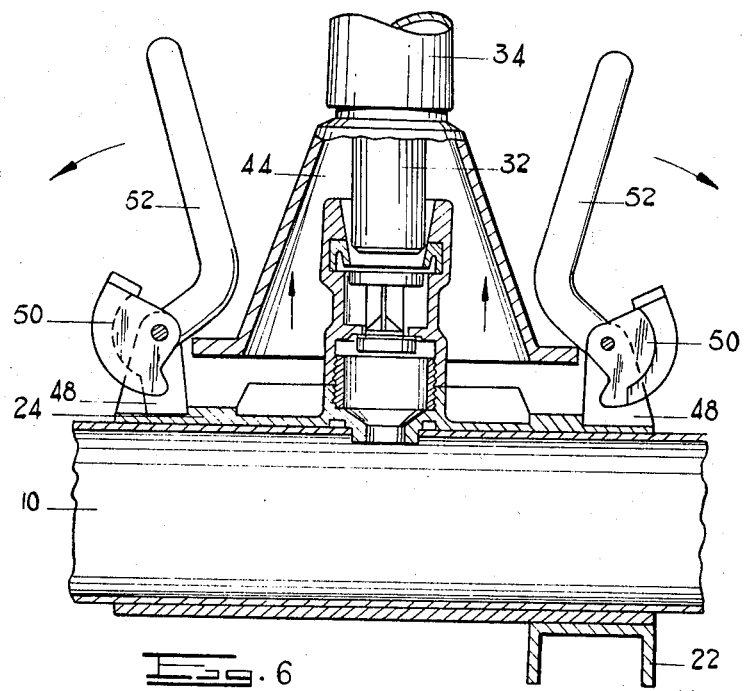

United States Patent Office 3,443,581
Patented May 13, 1969

3,443,581
MEANS FOR SECURING STANDPIPES TO IRRIGATION PIPELINES
Hugh R. Lyell, Nelspruit, Transvaal, Republic of South Africa, assignor to Dowson & Dobson Limited, Selby, Johannesburg, Republic of South Africa
Filed Oct. 24, 1966, Ser. No. 589,007
Claims priority, application Republic of South Africa, Oct. 29, 1965, 5,838/65
Int. Cl. F16l 37/28, 37/18; F16k 43/00
U.S. Cl. 137—322     10 Claims

ABSTRACT OF THE DISCLOSURE

A device for mounting a standpipe on an irrigation pipeline has a stub pipe projecting upwardly from the pipe, adapted sealably to receive the lower end of the standpipe, a frustoconical skirt on the standpipe which surrounds the stub pipe and is spaced from it, a base plate on which the hem of the skirt comes to rest, and pivoted cams which detachably secure the hem to the platform to stabilize the standpipe.

---

This invention relates to irrigation pipelines. The problem of erecting standpipes at intervals along the pipeline of an irrigation system is not troublesome if the standpipes are short; but, when they are long, such as is the case in, for instance, sugarcane fields where the standpipes may be twelve feet high, the problem is very apparent. To stabilize the standpipes against vibration, which can affect the distribution of the spray and which promotes wear of the couplings, a common expedient is to steady each standpipe with a tripod structure. This is apt to be troublesome, as the tripod is cumbersome and it must be borne in mind that the erection of the standpipes often takes place at night when it is not easy to see what one is doing. Other devices have been tried, but none of them can claim complete success.

The object of the present invention is to provide a device which is easy to operate, even in semidarkness and with raw labor, and which provides considerable stability for the standpipe against vibration.

According to the invention, the lower end of the standpipe is formed to engage the stub of a vertical pipe projecting upwardly from the pipeline and in communication with the cavity of the pipeline, the pipe being adapted to receive the lower end of the standpipe, sealing means between the stub pipe and the lower end of the standpipe, a supporting structure fast with the standpipe and surrounding the lower end of the standpipe, and spaced from it to receive the stub pipe between the supporting structure and the standpipe, the supporting structure being a frustoconical skirt around the standpipe end, a base member firmly attached to the pipeline and arranged to be engaged by the lower end of the supporting structure when the standpipe is engaged within the stub pipe, and means to clamp the structure detachably to the base member.

Further according to the invention, the clamping means is a series of cams mounted on the platform for pivotal movement in a path comprising a retracted position in which the cams are displaced from the path of movement of the skirt and a clamping position in which the cams engage the hem of the skirt to clamp it to the base member.

Each cam may be provided with a nose that intersects the path of movement of the skirt when the cams are in clamping position, for the cams to be rotated into retracted position by downward movement of the standpipe.

Also, the lower half of the clamp is secured to a beam extending transversely of the pipeline, and of considerable length relatively to the diameter of the pipeline.

The standpipe may have the normal means which acts to displace the closure member of the valve contained in the coupling, or the end of the standpipe may perform this task; so that flow of water commences automatically when the standpipe is connected, and is automatically arrested when the standpipe is withdrawn.

An embodiment of the invention is illustrated in the accompanying drawings, in which FIGURE 1 is a side elevation of the device of the invention mounted on a pipeline;

FIGURE 2 is an end elevation; and

FIGURES 3 to 7 are vertical sections illustrating successive steps in the operation of the device.

Figure 7:
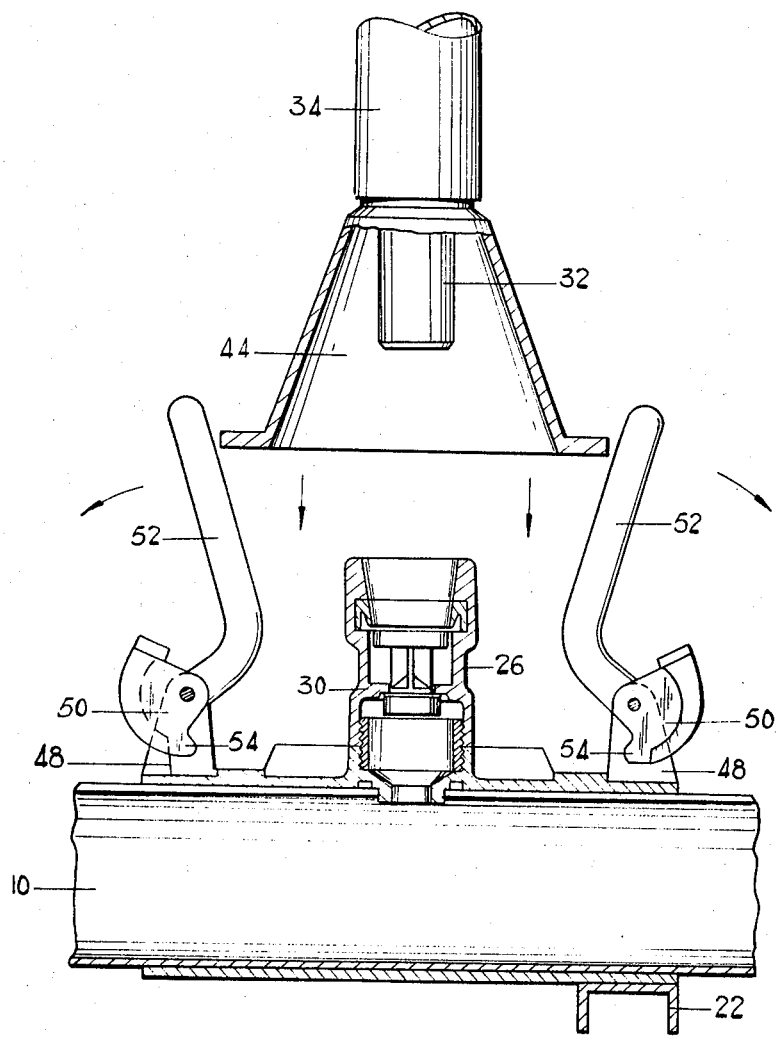

In the drawings, the pipe into which the devices of the invention are assembled is numbered 10. A split clamp 12 encircles the pipe 10. The two halves of the clamp are connected together by nuts and bolts 14, passing through registering flanges 16. The lower half of the clamp, 12, is integral with splayed out legs 20, the feet of which may rest on a stable horizontal surface, but which are preferably bolted to a channel-shaped beam 22 of considerable length relatively to the diameter of the pipeline, that rests upon the ground. The beam may be made of a light material such as aluminum, for ease of transport.

The upper part of the clamp forms a saddle 24, on which is mounted a stub pipe 26 (FIGURES 3 to 7) which passes through a gap in the pipe around which it is sealed by a gasket 28. The stub pipe has a tapering bore at its upper end defining, with a floor 30, a chamber 31 to receive the lower end 32 of a standpipe 34. The chamber encloses a U-ring 36.

The floor 30 is centrally apertured for the passage of the stem 38 of the closure member 40 of a one-way valve. The stem is biassed upwardly by the pressure of water within the pipeline for the closure member to seat against the underface of the floor 30; and terminates in a head 42.

The lower end 32 of the standpipe is dimensioned to enter the stub pipe 26, to pass through the U-ring 36, and to depress the head 42 of the valve, to permit flow of water into the chamber and thence to the standpipe 34. The pressure of water in the chamber acts to seal the U-ring with the standpipe.

The lower end 32 of the standpipe is of lesser diameter than the main part of the standpipe. At the junction of the reduced end with the remainder of the standpipe, is connected a frustoconical skirt 44, into the cavity of which the stub pipe 26 is received as the standpipe end 32 passes into the stub pipe.

The skirt 44 has, at its hem, an annular flange 46. The saddle 24 carries a pair of lugs 48 to each of which is pivoted a cam 50 oscillatable by a lever 52. The flange 46 is dimensioned to fit between the lugs 48. The cams are formed with noses 54 which, when the levers 52 are depressed, lie within the path of movement of the flange 46.

The device of the invention may be located at a joint in the pipeline, in which case the split clamp may constitute a coupling, with suitable gaskets to seal it with the butted pipes. Usually, however, the device will be located between joints.

In use, the end 32 of the standpipe is offered to the socket of the stub pipe 26 (FIGURE 3). In the exceptional case (FIGURE 7) in which the levers 52 are erect, the approaching movement of the standpipe brings the flange 46 into contact with the levers and depresses them to the FIGURE 3 position.

As the pipe end 32 advances into the pipe 26, the flange 46 comes into contact with the noses 54 of the levers 52, and causes the levers to swing upwardly (FIG- URE 4). Further movement of the standpipe brings the flange below the level of the noses 54, whereupon the levers tilt, as shown in FIGURE 5, to bring the cam surfaces into contact with the upper face of the flange. It may be necessary to press the levers downwardly to clamp the flange between the cams and the saddle 24, but usually the downward movement of the levers due to gravity as the noses are released by the flange will be sufficient to clamp the flange.

During the entering movement of the pipe end 32, it makes contact with the head 42 of the valve, and depresses the stem against the resistance of the water pressure in the pipeline, until the closure member 40 is clear of its seat and water flows from the pipeline into the chamber 31, and so into the standpipe.

Release of the standpipe is effected by rotating the levers upwardly (FIGURE 6) to release the flange 46 from the cams 50. The standpipe can then be withdrawn by upward movement, whereupon the disengagement of the head 42 by the pipe end 32 and the water pressure in the pipeline restores the valve to closed position.

Since the operation of the device consists only in offering the standpipe end to the stub pipe, it can be achieved in semidarkness, and without skill. The uncoupling operation is almost as easily effected.

When the standpipe is engaged, the conical skirt is stably supported by the saddle, and the clamp is buttressed against rotation by the beam 22. The skirt supports the standpipe against movement. There is inevitably some whip in long standpipes, but this will not significantly affect the spray pattern. The whip may be advantageous to the extent that it causes the standpipe end to become more firmly settled into the stub pipe which promotes the clamping of the flange 46 by the cams.

I claim:

1. A device for mounting a standpipe on an irrigation pipeline, consisting of a vertical stub pipe projecting upwardly from the pipeline, and in communication with the cavity of the pipeline, a standpipe, the stub pipe being adapted to receive the lower end of the standpipe, sealing means between the stub pipe and the lower end of the standpipe, a frustoconical skirt surrounding the stub pipe and spaced from it, a base fast with the pipeline presenting an upward surface to receive the hem of the skirt when the standpipe is engaged within the stub pipe, and means detachably to clamp the skirt to the base.

2. The device of claim 1 in which the base is part of a split clamp that encircles the pipeline.

3. The device of claim 1 in which the clamping means is a series of cams pivotally mounted on the base, and arranged for movement between a retracted position in which the cams are displaced from the path of movement of the standpipe end, and a clamping position in which the cams engage the skirt to clamp it to the base member.

4. The device of claim 3 in which each cam has a nose that intersects the path of movement of the hem of the skirt when the cam is in clamping position.

5. The device of claim 3 in which the skirt hem is an outward flange arranged to be engaged by the cams when they are in clamping position.

6. The device of claim 1 including a valve within the stub pipe and biassed to closed position, controlling flow of water from the pipeline into the stub pipe, the closure member of the valve being located within the path of movement of the lower end of the standpipe.

7. A device for mounting a standpipe on an irrigation pipeline, consisting of a vertical stub pipe projecting upwardly from the pipeline and in communication with the cavity of the pipeline, the pipe being adapted to receive the lower end of the standpipe, sealing means between the stub pipe and the lower end of the standpipe, a supporting structure fast with the standpipe and surrounding the lower end of the standpipe and spaced from it to receive the stub pipe between the supporting structure and the standpipe, the supporting structure being a frustoconical skirt around the standpipe end, a base member firmly attached to the pipeline and arranged to be engaged by the lower end of the supporting structure when the standpipe is engaged within the stud pipe, and means to clamp the structure detachably to the base member.

8. A device for mounting a standpipe on an irrigation pipeline, consisting of a vertical stub pipe projecting upwardly from the pipeline, and in communication with the cavity of the pipeline, a standpipe, the stub pipe being adapted to receive the lower end of a standpipe, sealing means between the stub pipe and the lower end of the standpipe, a supporting structure fast with and surrounding the lower end of the standpipe, and spaced from it to receive the stub pipe between the supporting structure and the standpipe, a base firmly attached to the pipeline and arranged to be engaged by the lower end of the supporting structure when the standpipe is engaged within the stub pipe, means to clamp the structure to the base, and a substructure fast with the base, and engaging the ground well beyond the pipeline and to each side of it; the substructure being a beam fast with the base and projecting laterally to each side of the pipeline, and the supporting structure being a frustoconical skirt surrounding the stub pipe and spaced from it, the hem of the skirt having an outward flange that is arranged to be engaged by the clamping means.

9. The device of claim 8 in which the clamping means is a series of cams pivotally mounted on the base and arranged for movement between a retracted position in which the cams are displaced from the path of movement of the standpipe end, and a clamping position in which the cams engage the skirt to clamp it to the base member.

10. The device of claim 9 in which each cam has a nose that intersects the path of movement of the hem of the skirt when the cam is in clamping position.

References Cited

UNITED STATES PATENTS

| 2,461,818 | 2/1949 | Hague | 137—614 |
| 2,518,026 | 8/1950 | Krapp | 285—312 |
| 2,889,849 | 6/1959 | Shohan | 137—322 |

FOREIGN PATENTS 930,015  7/1963  Great Britain.

HAROLD W. WEAKLEY, *Primary Examiner.*

U.S. Cl. X.R.

137—356; 251—146, 149.1; 285—197, 312